US007875848B2

(12) United States Patent
Nagano et al.

(10) Patent No.: US 7,875,848 B2
(45) Date of Patent: *Jan. 25, 2011

(54) ION TRAP, MASS SPECTROMETER, AND ION MOBILITY ANALYZER

(75) Inventors: Hisashi Nagano, Nishitokyo (JP); Takashi Baba, Chapel Hill, NC (US); Hiroyuki Satake, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/422,382

(22) Filed: Apr. 13, 2009

(65) Prior Publication Data

US 2009/0256070 A1 Oct. 15, 2009

(30) Foreign Application Priority Data

Apr. 14, 2008 (JP) ............................ 2008-104487

(51) Int. Cl.
*H01J 49/26* (2006.01)
*B01D 59/44* (2006.01)

(52) U.S. Cl. ...................... 250/282; 250/288; 250/292; 250/290

(58) Field of Classification Search ................. 250/282, 250/292, 288, 290
See application file for complete search history.

(56) References Cited

U.S. PATENT DOCUMENTS

| | | | | |
|---|---|---|---|---|
| 2,939,952 | A | 6/1960 | Paul et al. | |
| 6,683,301 | B2 * | 1/2004 | Whitehouse et al. | 250/288 |
| 6,872,941 | B1 * | 3/2005 | Whitehouse et al. | 250/288 |
| 2009/0001265 | A1 * | 1/2009 | Baba et al. | 250/288 |

OTHER PUBLICATIONS

R. E. March et al., Quadrupole Storage Mass Spectrometry, ISBN 0-471-857947.

Raymond E. March, et al., Quadrupole Ion Trap Mass Spectrometry, ISBN 0471-488887.

* cited by examiner

*Primary Examiner*—Nikita Wells
(74) *Attorney, Agent, or Firm*—Antonelli, Terry, Stout & Kraus, LLP.

(57) ABSTRACT

A compact, low-cost, and simple ion trap capable of operating at a low vacuum level is provided along with technology for utilizing that ion trap to perform mass spectroscopy and analyzing ion mobility without a drop in measurement accuracy. Ions are trapped in a one dimensional potential formed by a potential comprised of a direct current voltage and a potential comprised of an alternating current voltage. The trapped ions are made to collide with an electrode by changing at least the applied direct current voltage or alternating current voltage, and are detected as an electrical current value.

18 Claims, 4 Drawing Sheets

ION TRAP, MASS SPECTROMETER, AND ION MOBILITY ANALYZER

CLAIM OF PRIORITY

The present application claims priority from Japanese patent application JP 2008-104487 filed on Apr. 14, 2008, the content of which is hereby incorporated by reference into this application.

FIELD OF THE INVENTION

The present invention relates to technology for mass spectroscopy to identify molecules within a sample by measuring the charge to mass ratio of the charged particles. This invention relates in particular to technology for trapping charged particles.

BACKGROUND OF THE INVENTION

A method called mass spectroscopy is capable of identifying a sample by measuring the ratio of mass to electrical charge (mass-to-charge ratio: m/z) in a sample enveloped within electrical charges such as ions within a magnetic field. A typical device and method for mass spectroscopy currently in wide use is the ion trap which captures ions within a trap made up of electrodes and then selectively emits ions by changing the electrical potential within the trap.

An ion trap called an RF (radio frequency) ion trap may for example utilize a Paul Trap constituted by one doughnut-shaped electrode (called a ring electrode) enclosed by two bowl-shaped electrodes (called end caps) to focus ions at one point in the center of a ring electrode by applying a radio frequency voltage to that ring electrode. (Refer for example, to U.S. Pat. No. 2,939,952, Quadruple Storage Mass Spectrometry: R. E. March and R. J. Hughes, John Wiley and Sons ISBN 0-471-85794-7, Quadruple Ion Trap Mass Spectrometery: Raymond E. March and John F. Todd, Wiley-Interscience ISBN 0-471-488887). This ion trap focuses the ions spatially in three dimensions within an electric field and is therefore sometimes called a three dimensional trap.

A linear ion trap is formed from four rod electrodes arrayed in parallel in a quadruple state, and traps ion in a center region made up by the four rods by applying a radio frequency voltage between the two facing electrode pairs. This ion trap is also called a two dimensional ion trap because the ions are focused in two directions by the radio frequency.

There is also a method for trapping charged particles around a center electrode (Refer for example to JP-A-Hei9 (1997)-61597) by overlapping a direct current field and an alternating current field and applying them to a space formed by a center electrode, and an external electrode made up of quadrupole rods.

SUMMARY OF THE INVENTION

Collision with gas must be avoided in all of these ion traps order to maintain an accurate ion trajectory within the magnetic field, and a high vacuum environment was required (e.g., 10 mTorr or less). A large-size turbo molecular pump with a large exhaust capacity was required to attain this type of vacuum environment. Mass spectroscopic equipment using the ion traps were therefore subject to the problems of a high cost, large size, and frequent maintenance as well as restrictions on usage.

In view of the above circumstances, this invention has the object of providing an ion trap with minimal restrictions on the usage environment, and further providing technology utilizing that ion trap for performing mass spectroscopy and ion mobility analysis with no drop in measurement accuracy.

This invention traps ions in a one dimensional potential that is a potential comprised of a direct current voltage and a potential comprised of an alternating current voltage. The trapped ions are made to collide with an electrode by changing at least the applied direct current voltage or alternating current voltage, and are detected as an electrical current value.

More specifically, this invention is contains a first electrode connected to a first direct current source for applying a direct current voltage, and an alternating current source for applying an alternating current voltage and a second electrode that the charged particles can pass through, and is characterized in that charged particles are trapped in a one dimensional potential formed between the first electrode and the second electrode by a direct current potential from the direct current voltage and an alternating current potential from an alternating current voltage.

This invention is capable of performing mass spectroscopy and ion mobility analysis with no drop in measurement accuracy via an ion trap with minimal restrictions on the usage environment.

DETAILED DESCRIPTION OF THE PREFERRED EMBODIMENTS

First Embodiment

Figure 1:
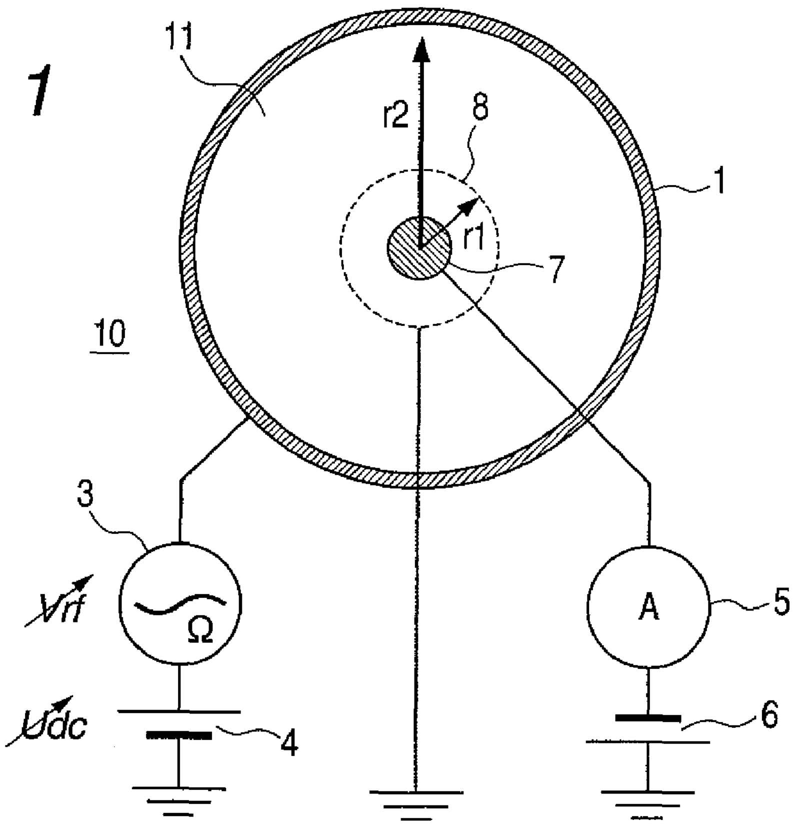
FIG. 1 is a drawing for describing an example of the basic circuit and the electrode structure of the one dimensional ion trap of the first embodiment.

The first embodiment of this invention is described next while referring to the present invention. FIG. 1 is a drawing for describing an example of the basic circuit and the electrode structure of the one dimensional ion trap of this embodiment. The example shown here utilizes a hollow-cylindrical one dimensional ion trap 10, and is described by utilizing a cross sectional view intersecting the center axis of that ion trap 10.

As shown in this drawing, the one dimensional ion trap 10 of this embodiment includes a first electrode (hollow-cylindrical electrode: radius r2) 1, and a second electrode (mesh hollow-cylindrical electrode: radius r1 (r1 <r2) 8, and a third electrode (solid-cylindrical electrode) 7 installed on the inner side of the second electrode. The hollow-cylindrical electrode 1 and the mesh hollow-cylindrical electrode 8 and the Solid-cylindrical electrode 7 are each a hollow cylindrical shape, and are positioned along a joint center axis. An RF voltage (amplitude $V_{rf}$, frequency: Ω/2π) from the alternating current source 3, and a direct current (DC) voltage ($U_{dc}$) from the direct current source 4 are applied to the hollow-cylindrical electrode 1. The mesh hollow-cylindrical electrode 8 is grounded. An ammeter 5 is connected to the Solid-cylindrical electrode 7.

The one dimensional ion trap 10 of this embodiment forms a one dimensional potential between both electrodes by applying a specified RF voltage $V_{rf}$ and a direct current voltage (static voltage) $U_{dc}$ to the hollow-cylindrical electrode 1, and by grounding the mesh hollow-cylindrical electrode 8 to trap the charged particles (here called "ions"). The space between the hollow-cylindrical electrode 1 and the mesh hollow-cylindrical electrode 8 is from hereon called the trapping space 11.

The trapped ions reach an unstable state due to the change in the RF voltage $V_{rf}$ and direct current voltage (static voltage) $U_{dc}$, pass through the mesh of the mesh hollow-cylindrical electrode 8, and strike the Solid-cylindrical electrode 7. The electrical current in the one dimensional ion trap 10 of this embodiment when the ions have struck the Solid-cylindrical electrode 7, is measured by the ammeter 5.

Figure 2:
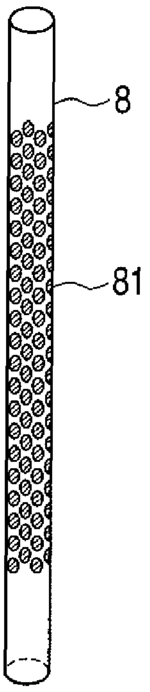
FIG. 2 is a drawing showing an example of the mesh hollow-cylindrical electrode of the first embodiment.

The mesh hollow-cylindrical electrode 8 therefore contains numerous holes 81 capable of passing the trapped ions. FIG. 2 is a drawing showing an example of the mesh hollow-cylindrical electrode 8 of this embodiment. The holes 81 are a size that allows ions to pass through, and moreover does not impart effects from changes in the spatial charge due to ion movement to the Solid-cylindrical electrode 7. Besides a circular shape, the holes may be a line shape, elliptical, square, or a mesh shape, etc. The Solid-cylindrical electrode 7 may be any shape allowing it to be struck by the charged particles. The Solid-cylindrical electrode 7 need not be hollow and may for example be a screw shape. However, most preferable is a shape across the entire side surface that maintains a fixed distance to the side surface of the mesh hollow-cylindrical electrode 8.

The Solid-cylindrical electrode 7 also contains a direct current source 6, and may be structured so that this direct current source 6 applies a direct current voltage whose voltage potential is opposite that of the trapped ions. Applying this direct current voltage makes the ions pass through the holes of the mesh hollow-cylindrical electrode 8 and makes it easy for the ions to strike the Solid-cylindrical electrode 7.

Applying an RF voltage $V_{rf}$ and a direct current voltage (static voltage) $U_{dc}$ to the hollow-cylindrical electrode 1 of the one dimensional ion trap 10 of this embodiment utilizing the above described electrode placement and voltages causes the RF voltage $V_{rf}$ to form an RF potential and the static voltage $U_{dc}$ to form a direct current (DC) potential. The RF potential applies an outward-directed force (direction from mesh hollow-cylindrical electrode 8 to hollow-cylindrical electrode 1) to the ions between both electrodes. This outward-directed force is not dependent on the ion polarity (positive ions or negative ions). The DC potential applies an inward-directed force opposite the outward-directed force of the RF potential (direction from hollow-cylindrical electrode 1 towards the mesh hollow-cylindrical electrode 8) to the ions. The direction of the force that the static voltage $U_{dc}$ applies to the ions is dependent on the polarity of ions so when trapping positive ions the static voltage $U_{dc}$ is applied so that the hollow-cylindrical electrode 1 is a positive polarity relative to the mesh hollow-cylindrical electrode 8; and conversely when trapping negative ions, the static voltage $U_{dc}$ is applied so that the hollow-cylindrical electrode 1 is a negative polarity relative to the mesh hollow-cylindrical electrode 8.

This outward-directed force and inward-directed force are dependent on the distance from the center axis of the hollow-cylindrical electrode 1 and the mesh hollow-cylindrical electrode 8. The position where both balance each other is determined by the mass-to-charge ratio (m/z) of the ions, and the ions are trapped there. Ions possessing the same mass-to-charge ratio (m/z) converge onto the surface of the cylinder that is a fixed distance from the center axis from the contours of the hollow-cylindrical electrode 1 and the mesh hollow-cylindrical electrode 8.

The above principle is described using these formulas. The one-dimensional potential ϕ formed in the trapping space 11 is given by the following formula (1) expressing the function of time t and the distance r from the center axis.

$$\phi(t, r) = \frac{\log r/r_1}{\log r_2/r_1}(V_{rf}\cos\Omega + U_{dc}) \tag{1}$$

When a potential ϕ is applied as shown in formula (1), the average potential Φ applied as a force acting on the ions per unit of time is given by the following formula (2).

$$\begin{aligned}\Phi(r) &= \frac{Ze}{4m\Omega^2}\vec{E}_0^2 + \frac{\log r/r_1}{\log r_2/r_1}U_{dc} \\ &= \frac{Ze}{4m\Omega^2}\left(\frac{1}{\log r_2/r_1}\right)^2\frac{V_{rf}^2}{r^2} + \frac{\log r/r_1}{\log r_2/r_1}U_{dc}\end{aligned} \tag{2}$$

The pseudo-potential method usually utilized in RF ion trapping theory is used here to calculate the formula (2). The Ze within the formula expresses the mass-to-charge ratio (m/z) (and same hereafter). The right-side first term of formula (2) is the RF potential (pseudo-potential) generated by the RF voltage $V_{rf}$. The second term is the DC potential generated by the static voltage $U_{dc}$. The potential Φ expressed by summing this RF potential and DC potential in the formula (2) is the potential (total potential) of the one dimensional ion trap 10 of this embodiment.

Figure 3:
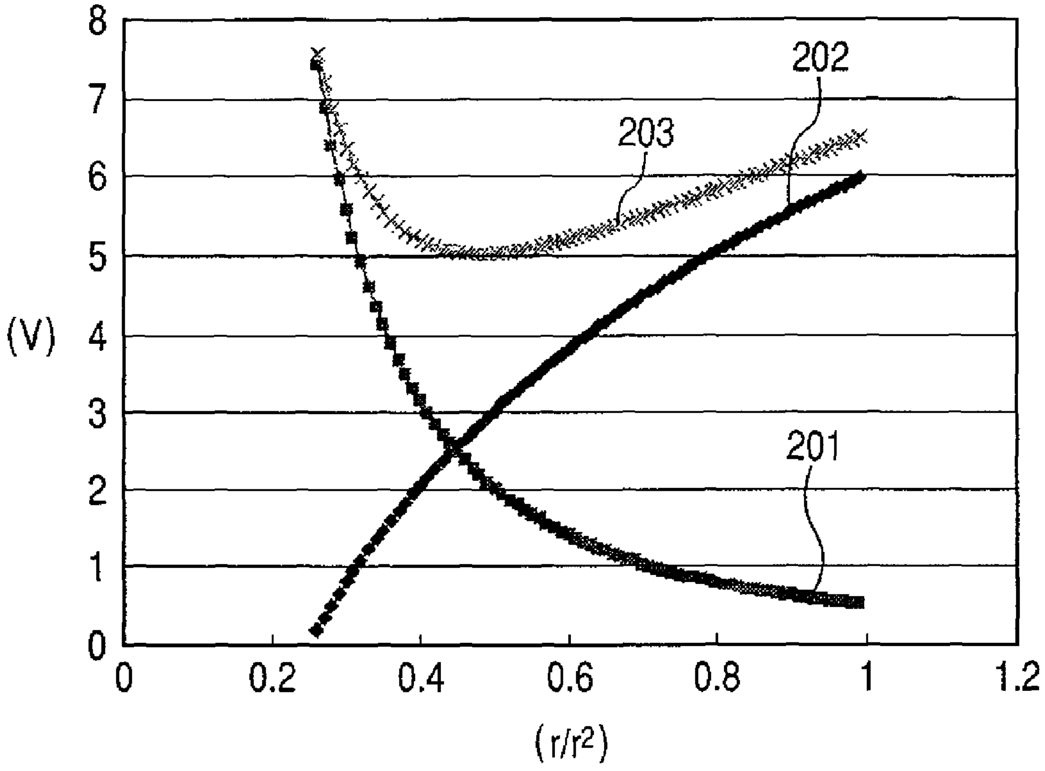
FIG. 3 is a drawing for describing the one dimensional potential of the first embodiment.

FIG. 3 is a graph showing the potential applied in formula (2). The graph 201 is the RF potential shown in the right-side first term of formula (2). The graph 202 is the DC potential shown in the second term. The graph 203 is the total potential. The potential (total potential 203) generated by the one dimensional ion trap 10 of this embodiment at the position where the above described outward directed and inward-directed forces balance as shown in the figure, is an extremely small value. The position yielding this minimal value is given in formula (3) derived from the formula (2).

$$r_{min} = \left(\frac{Ze}{2m\Omega^2}\frac{1}{\log r_2/r_1}\frac{V_{rf}^2}{U_{dc}}\right)^{1/2} \tag{3}$$

In order to obtain this minimal value, the polarity of the static voltage $U_{dc}$ relative the above described ion polarity is decided in advance.

One can see from formula (3) that ions can be stably trapped on the hollow-cylindrical surface having a specified distance from the center axis as defined by the position $r_{min}$ that gives the minimal value. One can also see that the position $r_{min}$ for stable trapping of ions will differ according to the mass-to-charge ratio (m/z) of the ions. Ions with different mass-to-charge ratio (m/z) are in this way trapped within a hollow-cylindrical shape at a different radius (position) within the one dimensional ion trap of this embodiment. This method is for that reason called a one dimensional ion trap. In other words, ions possessing a large mass-to-charge ratio (m/z) are trapped on the inner side near the center axis, and ions possessing a small mass-to-charge ratio (m/z) are trapped on the outer side.

The ion mass range capable of being trapped by the one dimensional ion trap 10 of this embodiment is described here. The ion trapping range of the one dimensional ion trap 10 of this embodiment is within a trapping space 11 between the hollow-cylindrical electrode 1 (radius r2) and the mesh hollow-cylindrical electrode 8 (radius r1). The one dimensional ion trap 10 of this embodiment can therefore trap ions possessing the minimal value $r_{min}$ as the stable point in this space. A formula expressing this condition is expressed next as formula (4).

$$r_1 < r_{min} < r_2 \tag{4}$$

The threshold values (stable boundary) for a trappable ion mass are set as $m_1$ and $m_2$. The value $m_1$ satisfies the condition that $r_{min}$ is larger than $r_1$ (ions do not strike the mesh hollow-cylindrical electrode 8) and the value $m_2$ satisfies the condition that $r_{min}$ is smaller than $r_2$ (ions do not strike the hollow-cylindrical electrode 1). The threshold values $m_1$ and $m_2$ are expressed in the following formula (5) and formula (6).

$$m_1 = \frac{ZeV_{rf}^2}{2\Omega^2 U_{dc}} \frac{1}{r_1^2 \log r_2 / r_1} \tag{5}$$

$$m_2 = \frac{ZeV_{rf}^2}{2\Omega^2 U_{dc}} \frac{1}{r_2^2 \log r_2 / r_1} \tag{6}$$

Ions whose mass is between $m_1$ and $m_2$ can be trapped by the one dimensional ion trap 10 of this embodiment. This stable region is present within the one dimensional ion trap 10 of this embodiment. As one can see from these formulas, the mass range of ions trappable by the one dimensional ion trap 10 of this embodiment is dependent on the value for the RF voltage $V_{rf}$ and the static voltage $U_{dc}$.

The shapes of the hollow-cylindrical electrode 1 and the mesh hollow-cylindrical electrode 8 in the above embodiment were each a hollow-cylindrical shape but the invention is not limited to this structure. If the electrode surfaces are split perpendicular to the center axis then any structure may be used where the intensity of the force applied to the ions is a sparse to dense distribution between both electrodes, such as a structure where those two electrode cross sections are formed in a concentric circular shape.

The trapping of ions along the center axis is described next. A structure for preventing ions trapped at specified positions along the radius by the above described principle from leaking along the center axis is described next for the case where the electrodes of the one dimensional ion trap 10 of this embodiment are respectively Solid-cylindrical and hollow-cylindrical electrodes of a limited length. A structure for achieving this is shown in FIG. 4.

Figure 4A:
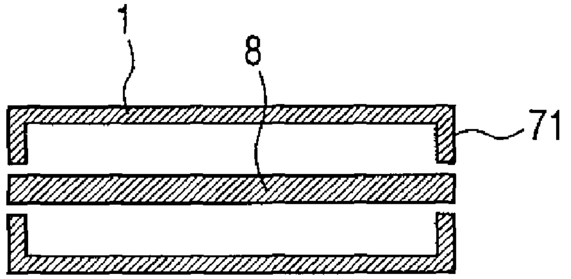
FIG. 4A and FIG. 4B are drawings for describing the electrode structure for trapping ions along the center axis of the one dimensional ion trap of the first embodiment.
Figure 4B:
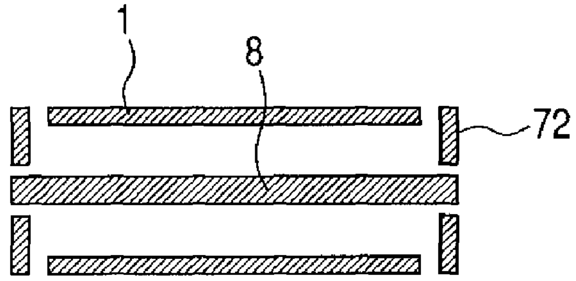

As shown in FIG. 4A, the one dimensional ion trap 10 of this embodiment contains the end electrodes 71 on both ends of the center axis of hollow-cylindrical electrode 1 in order to trap ions at specified position along the center axis. The hollow-cylindrical electrode 1 and end electrodes 71 are electrically connected in a single structure. The RF voltage $V_{rf}$ is in this way deformed and generates an ion convergence force as the pseudo-potential. Moreover a structure as shown in FIG. 4B containing disk shaped end electrodes 72 at both ends of the hollow-cylindrical electrode 1 may be utilized to apply a direct current voltage to prevent ion leakage.

The ammeter 5 in this way detects ions trapped as described above that strike the Solid-cylindrical electrode 7 so that the one dimensional ion trap 10 of this embodiment can be utilized for mass spectroscopy and measurement of ion mobility. These operations are described in detail in a subsequent embodiment but the principle is as described below.

Ions in the one dimensional ion trap 10 of this embodiment described above are trapped on the hollow-cylindrical surface at different radii $r_{min}$ applied by the formula (3) according to the mass-to-charge ratio (m/z). The radius rmin however is dependent on the value of RF voltage $V_{rf}$ and the static voltage $U_{dc}$ as shown in formula (3). The trap position $r_{min}$ of trapped ions can therefore be changed by changing at least one of either the RF voltage $V_{rf}$ or the static voltage $U_{dc}$.

By changing at least one of either the RF voltage $V_{rf}$ or the static voltage $U_{dc}$, the one dimensional ion trap 10 of this embodiment, changes the radial position of the trapped ions, and ultimately makes the ions pass the mesh hollow-cylindrical electrode 8 and strike the Solid-cylindrical electrode 7. A control section for example (not shown in the drawings) regulates these voltages. The current caused by ions trapped at different radial positions $r_{min}$ according to the mass-to-charge ratio (m/z) can in this way be sequentially detected and the particle (or mass) spectrum may for example be acquired.

The ions of the sample are supplied from a hole (not shown in drawing) formed in the hollow-cylindrical electrode 1. In this case, the installation environment for the one dimensional ion trap 10 of this embodiment may be any environment provided a vacuum intensity of 1 Torr (approximately 133 Pa) can easily be provided such as by a roughing vacuum pump (low vacuum intensity pump such as a rotary pump, diaphragm pump, scroll pump). In view of the relation between vacuum intensity and viscosity resistance, a typical value for ion mobility K in this case is 0.8 to 2.4 $cm^2/V/sec$ (for an ambient pressure of 14 to 500 amu). (Refer for example to "Ion Mobility Spectrometry" B. A. Eicemann & Z. Karpas CRC Press. 2005.)

When the trajectory of the ions supplied from the hollow-cylindrical electrode 1 is calculated under these conditions, the results obtained show the ions are supplied within one millisecond or less. The one dimensional ion trap 10 of this embodiment in other words stabilizes the ions in approximately one millisecond. This quick stabilization allows high speed operation.

To supply ions even more quickly without changing the ion stabilizing position, the RF voltage $V_{rf}$ and the static voltage $U_{dc}$ can be increased to enhance the one dimensional potential that was formed. As shown in formula (3), formula (5) and formula (6), the shape of the one dimensional potential that is formed does not change if the RF voltage $V_{rf}$ and static voltage $U_{dc}$ relation: $V_{rf}^2 \propto U_{dc}$ is maintained so the ions are converged on the radius position according to the mass-to-charge ratio (m/z).

The ions in the one dimensional ion trap 10 of this embodiment as already described are each converged on a hollow-cylindrical surface specified at a radius of $r_{min}$ given in formula (3) according to their respective mass-to-charge ratios (m/z). The one dimensional ion trap 10 of this embodiment can therefore trap the ions in a state where easily separable according to their individual mass-to-charge ratios (m/z). Moreover the hollow-cylindrical and Solid-cylindrical used for the electrodes are easy to form and are few in number. The ion trap can therefore be easily and inexpensively produced.

Moreover changes in the spatial charge caused by ion movement can be limited by generating charges with a voltage potential opposite that of the ions in the mesh hollow-cylindrical electrode 8, and there are no effects on the Solid-cylindrical electrode 7 that detects the electrical current. The Solid-cylindrical electrode 7 of the present embodiment can therefore accurately detect electrical current caused by the ion collision without being affected by changes in the spatial charge.

The structure of the one dimensional ion trap 10 of this embodiment applies no radio frequency voltage to the Solid-cylindrical electrode 7 that detects electrical current. In structures where a radio frequency voltage is applied to electrodes that detect electrical current, the coil in the amplifying transformer picks up noise and this noise affects the detection of electrical current. However, in the structure of this embodiment the Solid-cylindrical electrode 7 can accurately detect the electrical current caused by ion collisions without being affected by noise caused by the RF voltage.

The one dimensional ion trap 10 of this embodiment is an ion detection method that senses ion electrical current. This ion trap can in other words operate under a low vacuum since it detects by the static principle without relying on the resonant vibration of the ions. The above described roughing vacuum pump is therefore sufficient and no turbo molecular pump for achieving a high vacuum is needed. Moreover, an interactive effect from coulomb force is avoided because the ions are converged on the hollow-cylindrical surface at different radii according to their mass-to-charge ratios (m/z). Large quantities of ions can therefore be trapped and no amplification such as from photo multiplier tubes is needed even during this ion detection.

The mass range of ions trappable by the one dimensional ion trap 10 of this embodiment is defined in the above formula (5) and formula (6). Given the following values for example which are values normally used as the voltage conditions and size, and calculating the range of the mass-to-charge ratios (m/z) where ions are capable of being trapped in the one dimensional ion trap 10 of this embodiment from the formula (5) and formula (6), yields 13 to 1325 (m/z).

RF amplitude (frequency): 200 V (2 MHz)

DC voltage: 1 V $r_1$=2 mm $r_2$=20 mm

Length of the hollow-cylindrical electrode 1, mesh hollow-cylindrical electrode 8, and Solid-cylindrical electrode 7=90 mm.

Matter capable of being trapped by the one dimensional ion trap 10 of this embodiment when the ion valence z is 1, is within a molecular mass from approximately 13 to 1300. The ion valence z is usually 1 for the many types of environmental contaminant substance, illicit drugs and hazardous substances that are subject to being trapped in the ion trap, and their molecular mass (or weight) is within the above range. The one dimensional ion trap 10 of this embodiment is therefore sufficiently capable of trapping general substances that are likely to be subjected to trapping.

The forced motion (so-called micro motion) due to the high frequency in ions with a small mass-to-charge ratio (m/z) generally causes the position of the ions to become blurry and affects the mass resolution in mass analysis applications. Increasing the RF frequency, and reducing the static voltage $U_{dc}$ is effective in reducing this micro motion. The one dimensional ion trap 10 of this embodiment is usually capable of stably trapping ions targeted for trapping, when set to an RF frequency of 2 MHz. In other words, the appropriate frequency is sufficiently large. The effect rendered by high-frequency micro motion is therefore minimal.

When the range (stable range) for trapping the target ions stably within the trapping space 11 is small, the static voltage potential can be enhanced by increasing the static voltage $U_{dc}$ and the RF potential can be enhanced by lowering the frequency of the voltage $V_{rf}$ or the range can be expanded by both increasing the static voltage $U_{dc}$ and lowering the frequency of the voltage $V_{rf}$. The ion signal strength for example can be raised and the ion stability region relative to the RF potential and the static potential can be expanded by lowering the RF frequency from 2 MHz to 1.5 MHz. The quantity of trappable ions can in this way be increased.

The alternating current voltage $V_{rf}$ to apply may be varied according to the charged particle targeted for trapping. When the charged particle is an ion for example then an RF voltage of several hundred kHz to 10 MHz may be utilized as the alternating current voltage $V_{rf}$. When the charged particles are dust on the other hand then a low-frequency voltage may be utilized that is lower than when trapping ions.

The mass range of the one dimensional ion trap 10 of this embodiment as already described is determined by the value of the RF voltage $V_{rf}$ and static voltage $U_{dc}$. Utilizing this property also allows isolating ions possessing the specified mass-to-charge ratio (m/z) within the trapping space 11. In other words, the RF voltage $V_{rf}$ and static voltage $U_{dc}$ may be changed, to make the $m_1$ (heavy side) or $m_2$ (light side) value approach close to that of the mass $m_T$ of the mass-to-charge ratio (m/z) of the ions forming the target. When the value $m_1$ is brought in proximity to $m_T$ via formula (3) through formula (6), ions with a mass-to-charge ratio (m/z) larger than a mass-to-charge ratio ($m_T$/z) of the ions forming the target are eliminated. When the value $m_2$ is brought in proximity to $m_T$, ions with a mass-to-charge ratio (m/z) smaller than a mass-to-charge ratio ($m_T$/z) of the ions forming the target are eliminated. Those ions with a mass-to-charge ratio ($m_T$/z) forming the target can be isolated by repeatedly alternating the operation to bring $m_1$ close to $m_T$ with the operation to bring $m_2$ close to $m_T$. The resolution at which the ions are isolated is determined according to how near the stable boundary can be made to approach the mass-to-charge ratio ($m_T$/z) of the ions forming the target.

The one dimensional ion trap 10 of this embodiment as already described has few electrode points and is an easily formable shape and so can be inexpensively produced. Moreover, the electrode and voltage placement minimizes the effects from noise and effects from spatial charge variations due to movement of charged particles so that ion current can be detected accurately and efficiently. The measurement time can therefore be shortened. Moreover the ion detection method functions by detecting the ion current so that operation can be in a low vacuum when utilized in a mass spectrometer and amplification such as from photo multiplier tubes is not needed. The equipment can therefore be made compact. Because it possesses the above characteristics, the one dimensional ion trap 10 of this embodiment has no limitations on the usage location or environment, and can be widely utilized in general applications.

Second Embodiment

The second embodiment of this invention is described next. Here the one dimensional ion trap 10 of the first embodiment utilized in the mass spectrometer makes use of ion instability brought about by trap conditions. Namely, the voltage conditions of stably trapped ions are changed to bring about an unstable state, and the ions made to strike the Solid-cylindrical electrode 7 (selectively according to mass) at each mass-to-charge ratio (m/z). The electrical current resulting from the collision is measured by the ammeter 5, and the mass and mass-to-charge ratio (m/z) of the trapped ions are measured.

In order to selectively pass the ions trapped in the one dimensional ion trap 10 through the mesh hollow-cylindrical electrode 8 according to their mass, at least one of either the static voltage $U_{dc}$ and the amplitude of the RF waves applied by the RF voltage $V_{rf}$ is changed as described in the first embodiment.

Figure 5:
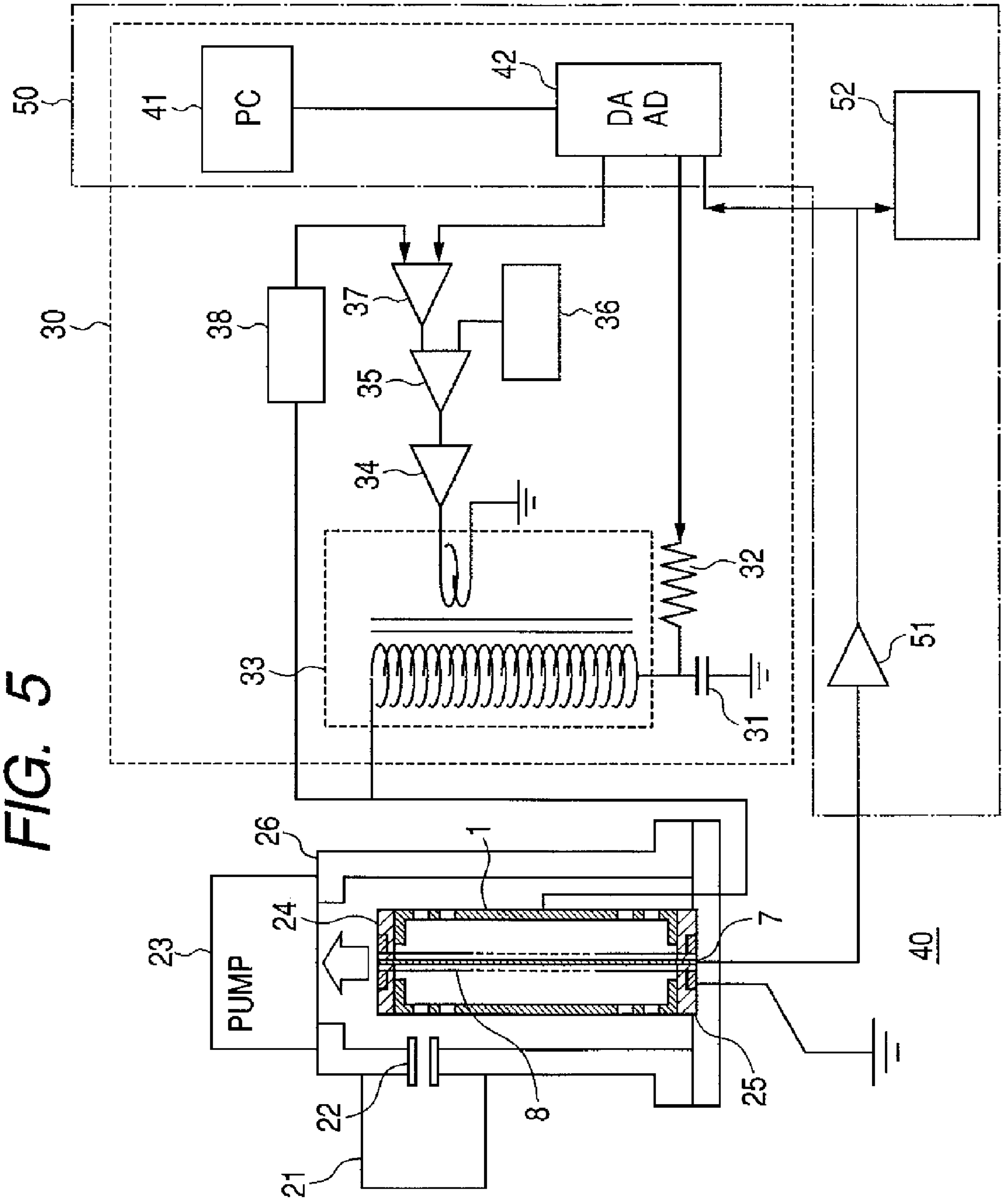
FIG. 5 is a structural drawing of the mass spectrometer of the second embodiment.

A structural drawing of the mass spectrometer 40 of this embodiment to achieve the above operation is shown in FIG. 5. The one dimensional ion trap 10 of the first embodiment is utilized as the one dimensional ion trap. In this drawing, the same reference numerals as in the first embodiment are assigned to the same structural elements. The mass spectrometer 40 of this embodiment as shown in the figure, includes the one dimensional ion trap 10 of the first embodiment; the insulating pieces 24, 25 supporting the one dimensional ion trap 10, a vacuum tank 26 for containing the one dimensional ion trap 10, a vacuum pump 23, an ion source 21, and a pipe 22 for supplying the ions emitted by the ion source 21 to the vacuum tank 26. Numerous lattice holes 81 with a diameter of 0.5 mm are formed for example in a matrix shape in the mesh hollow-cylindrical electrode 8 of the one dimensional ion trap 10.

The ions supplied to the one dimensional ion trap 10 are generated by the ion source 21 and supplied by the pipe 2 to the vacuum tank 26. The hollow-cylindrical electrode 1 contains holes for supplying ions that form the sample. The supplied ions are supplied into the one dimensional ion trap 10 from holes formed in the hollow-cylindrical electrode 1, and are trapped in the one dimensional potential formed between the hollow-cylindrical electrode 1 and the mesh hollow-cylindrical electrode 8.

The mass spectrometer 40 contains a power supply control unit 30 as a unit to control the alternating current source 3 and the direct current source 4 and the application of their voltages. The mass spectrometer 40 also contains a current detector 50 as the ammeter 5.

The power supply control unit 30 contains an oscillator 36, a multiplier 35, an RF amplifier 34, a step-up RF transformer 33, an RF amplifier monitor circuit 38, a condenser (capacitor) 31, a resistor 32, a feedback amplifier 37, a DA/AD converter 42, and a computer 41. The current detector 50 contains a current amplifier 51, a DA/AD converter 42, and a computer 41. The computer 41 controls the static voltage $V_{dc}$ and the amplitude of the RF waves being applied, and reads out the electrical current. The DA/AD converter 42 is installed between the computer 21 and the detector to convert signals between analog and digital. The computer 41 and the DA/AD converter 42 are here jointly used by the power supply control unit 30 and the current detector 50.

The current detector 50 contains an oscilloscope 52, and the signal amplified by the current amplifier 51 may also be detected by this oscilloscope 52. Moreover, pumps such as a diaphragm pump, rotary pump, and scroll pump may be utilized as the vacuum pump 23. A diaphragm pump may for example be utilized that is operated at a vacuum intensity of 150 Pa.

The application of the RF voltage $V_{rf}$ and static voltage $U_{dc}$ by the power supply control unit 30 is described here. The RF amplitude control voltage generated by the DA/AD converter 42 in response to a command from the computer 41, passes through the feedback amplifier 37 and is combined with the oscillator 36 signal in the multiplier 35, to form an amplitude-controlled RF signal, and is input to the RF amplifier 34. After being power-amplified in the RF amplifier 34, the RF signal is further amplified by the transformer 33 and input as the RF voltage $V_{rf}$ to the hollow-cylindrical electrode 1 of the one dimensional ion trap 10.

The voltage amplitude at the transformer 33 output terminal is converted to a low static voltage and input by way of the RF amplitude monitor circuit 38 to the feedback amplifier 37. The transformer 33 and RF frequency amplitude monitor circuit 38 and the feedback amplifier 37 form a negative feedback circuit and the voltage output from the transformer 33 is constantly regulated so as to be proportional to the control voltage output by the DA/AD converter 42.

The output signal from the oscillator 36 is preferably a sine wave but a square wave may be utilized. Either wave may be utilized because the circuit made up by the transformer 33 and the electrode of one dimensional ion trap 10 is a resonant circuit and only the resonant sine wave component is amplified so even if a square wave is used, the voltage actually applied to the one dimensional ion trap 10 is a sine wave.

The voltage generated by the DA/AD converter 42 is supplied by way of the resistor 32 (approximately 1 MΩ) and the transformer 33 to the hollow-cylindrical electrode 1 as the static voltage $U_{dc}$. The condenser 31 is connected to the transformer 33 to prevent the RF power from passing through the DA/AD converter 42. The resistor 32 and the condenser 31 function so that the RF power is present between the hollow-cylindrical electrode 1 and the transformer 33.

The power supply control unit 30 applies the RF voltage $V_{rf}$ and static voltage $U_{dc}$ across the mesh hollow-cylindrical electrode 8 and the hollow-cylindrical electrode 1 because the mesh hollow-cylindrical electrode 8 of the one dimensional ion trap 10 is connected to ground. A one dimensional potential is in this way formed between the hollow-cylindrical electrode 1 and the mesh hollow-cylindrical electrode 8.

The detection of electrical current in the current detector 50 is described next. Current resulting from ions striking the Solid-cylindrical electrode 7 is amplified by the current amplifier 51 connected to the Solid-cylindrical electrode 7 and recorded in the computer 41 by the DA/AD converter 42. If there is an oscilloscope 52 in the current detector 50 then an arrangement may be utilized where the current amplified in the current amplifier 51 is displayed on the oscilloscope 52.

The flow in the mass spectrometer 40 with the above structure of this embodiment from the supplying of ions to the detection of electrical current is described next. In the example given here, the case is described where the amplitude of the radio waves is changed in order to make the trapped ions selectively pass according to their mass through the mesh hollow-cylindrical electrode 8.

First of all, the power supply control unit 30 applies a specified RF voltage $V_{rf}$ and static voltage $U_{dc}$ to the one dimensional ion trap. A static voltage potential made up by this direct current voltage and an RF potential made up by an RF voltage form a one dimensional potential between the hollow-cylindrical electrode 1 and the mesh hollow-cylindrical electrode 8.

The ion source 21 generates ions, and supplies the ions by way of the pipe 22 and the vacuum tank 26 into the one dimensional ion trap 10. The supply of ions into the hollow-cylindrical electrode 1 is stopped after a specified quality has been supplied or after a specified time has elapsed. The supply of ions is stopped by methods such as ending the generation of ions in the ion source 21 or applying a voltage potential opposite the charge of the ions in the pipe 22. The ions reach an equalized state and ions with a large mass-to-charge ratio (m/z) converged on the inner side near the central axis, and ions with a small mass-to-charge ratio (m/z) converge on the outer side. The ions are in other words trapped at radii at different mass-to-charge ratios (m/z) on the hollow-cylindrical surface The computer 41 next scans in the direction where the RF amplitude of the RF signal applied to the hollow-cylindrical electrical 1 becomes smaller. The outward-directed force from the RF voltage $V_{rf}$ a then becomes smaller so that the ions move along the center. The spatial charge changes at this time due to a charge generated on the mesh hollow-cylindrical electrode 8 that is opposite the charge on the ions. This mesh hollow-cylindrical electrode 8 in the one dimensional ion trap 10 is however grounded so that this effect is limited to the mesh hollow-cylindrical electrode 8, and there is no effect on the Solid-cylindrical electrode 7 that detects the electrical current.

Ions moving along the center pass through the numerous holes 81 formed in the mesh hollow-cylindrical electrode 8 and strike the Solid-cylindrical electrode 7. Ions striking the Solid-cylindrical electrode 7 are detected as current in the current detector 50. The computer 41 at this time measures, and records the ion current relative to changes in the RF amplitude, and obtains the ion current (mass spectrum) corresponding to the ion mass-to-charge ratio (m/z). Formula (3) is utilized for converting from the RF amplitude to the ion mass-to-charge ratio (m/z).

The ionizing method in the ion source 21 used in the present embodiment is described next. In the ion source 21, an electrical charge is applied to ionize the sample. The ionizing method of this embodiment utilizes corona discharge. A corona discharge is generated at the tip of the needle by applying a high voltage to a needle shaped electrode. The corona discharge ionizes the nitrogen, oxygen, or water vapor inside the air and creates primary ions. The primary ions that are generated react with the sample to ionize the sample and create sample molecular ions. These sample molecular ions enter the vacuum tank 26 by way of the pipe 22 and are trapped in the one dimensional potential. These trapped ions are then subjected to mass spectroscopy. There are no particular restrictions on the ionizing method as long ions are generated from the sample. Other methods for example may include electrons or radiation sources, light, lasers, Penning discharge, and electro-spray, etc.

Figure 6:
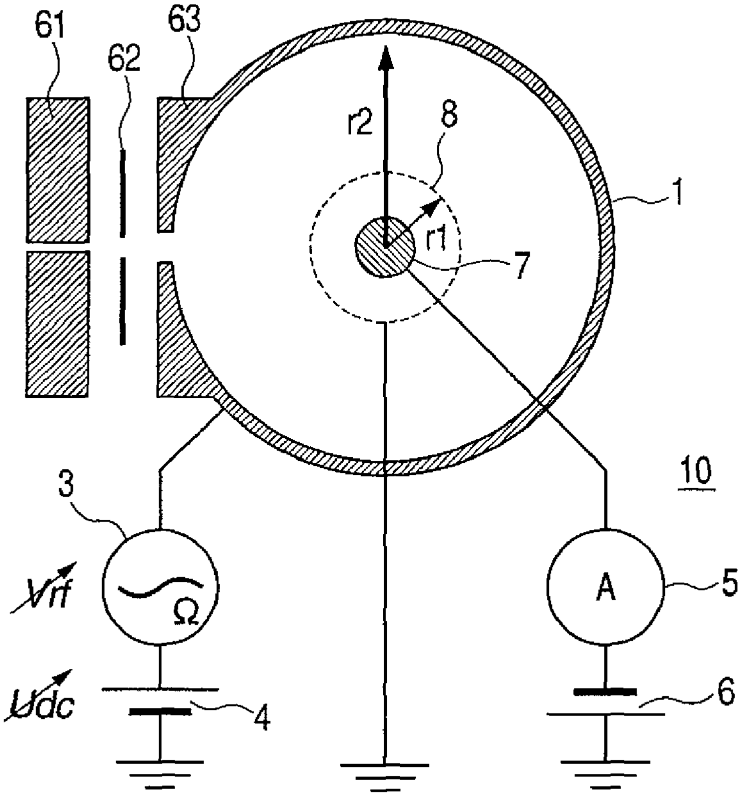
FIG. 6 is a drawing for describing an example of the basic circuit and the electrode structure for supplying ions in the second embodiment.

The structure for supplying ions generated by the ion source 21 to the one dimensional ion trap 10 with high efficiency is described here. FIG. 6 is a drawing for describing one example of the basic circuit and electrode structure for supplying ions with high efficiency to the one dimensional ion trap 10. The hollow-cylindrical electrode 1 here includes the input electrode 61 for inputting ions from the vacuum tank 26, the gate electrode 62, and the parallel electrode 63. The parallel electrode 63 is integrated with the hollow-cylindrical electrode 1 into a one piece structure. This structure is called the hollow-cylindrical electrode 1 with parallel electrode 63.

Fine holes with a length of 10 mm and diameter of approximately 120 μm is formed in the input electrode 61. The size of these fine holes is determined by the quantity of supplied ions and vacuum intensity of one dimensional ion trap, and the exhaust displacement of the vacuum pump used to exhaust the trap. In the case for example of a rotary pump with an exhaust speed for 2.5 $m^3$/h, the fine holes will be a diameter allowing a vacuum speed of approximately 150 Pa. The ions passing through the fine holes in the input electrode 61 are then supplied by way of the gate electrode 62 to the hollow-cylindrical electrode 1 with parallel electrode 63.

A voltage potential is applied to the gate electrode 62 to prevent the widening of ions due to adiabatic expansion after passing through the electrode 63. If the ions being used are negative for example then a voltage of −60 V is applied to the input electrode 61, a voltage of −30 V lower than the input electrode 61 is applied to the gate electrode 62, and a voltage of −1 V is applied to the hollow-cylindrical electrode 1 with parallel electrode 63. If using positive ions then a voltage potential opposite that of the negative ions is applied.

The hollow-cylindrical electrode 1 with parallel electrode 63 is installed to prevent the ion input efficiency into the hollow-cylindrical electrode 1 from deteriorating due to the one dimensional potential formed between the input electrode 61 and the hollow-cylindrical electrode 1. The RF voltage $V_{rf}$ and static voltage $U_{dc}$ are applied to the hollow-cylindrical electrode 1 with parallel electrode 63 in order to form a one dimensional ion trap between cylinder electrode 1 and the mesh hollow-cylindrical electrode 8. A static voltage potential and an RF potential are at this time generated between the mesh hollow-cylindrical electrode 8 and the hollow-cylindrical electrode 1 with parallel electrode 63. Moreover a static voltage potential and a radio frequency (RF) potential are at this time generated in the same way between the input electrode 61 and the hollow-cylindrical electrode 1 with parallel electrode 63. If the hollow-cylindrical electrode 1 with parallel electrode 63 is a typical hollow-cylindrical electrode, then the ions that passed through the fine holes of the input electrode 61 are drastically affected by the one dimensional potential formed between the input electrode 61 and the hollow-cylindrical electrode, and the ion input efficiency into the hollow-cylindrical electrode deteriorates. However when the parallel electrode 63 is attached to the hollow-cylindrical electrode 1, a parallel electrical field is formed between the input electrode 61 and the hollow-cylindrical electrode 1 with parallel electrode 63, and ions passing through the fine holes of the input electrode 61 are more greatly affected by this parallel electrical field rather than the one dimensional potential. Due to this effect, the ions proceed forward and smoothly enter into the hollow-cylindrical electrode 1 with parallel electrode 63. Ions can therefore enter with high efficiency into the one dimensional ion trap 10 by way of the hollow-cylindrical electrode 1 with parallel electrode 63.

If subjecting the ions trapped in the one dimensional ion trap 10 to mass spectroscopy, then a structure to cut off the supply of ions is required in order that new ions are not supplied to the one dimensional ion trap 10 during mass spectroscopy. Here, the supply of ions into the hollow-cylindrical electrode 1 with parallel electrode 63 is cut off by applying a voltage potential to the gate electrode 62 that is opposite that of the passing ions. In the case of negative ions for example, a voltage of +30 V is applied to the gate electrode 62, to stop negative ions from being input into the hollow-cylindrical electrode 1 with parallel electrode 63. In the case of positive ions, an opposite voltage potential is applied. The same effect can be obtained by applying an opposite voltage potential to ions passing through the input electrode 61 rather than the gate electrode 62.

Figure 7:
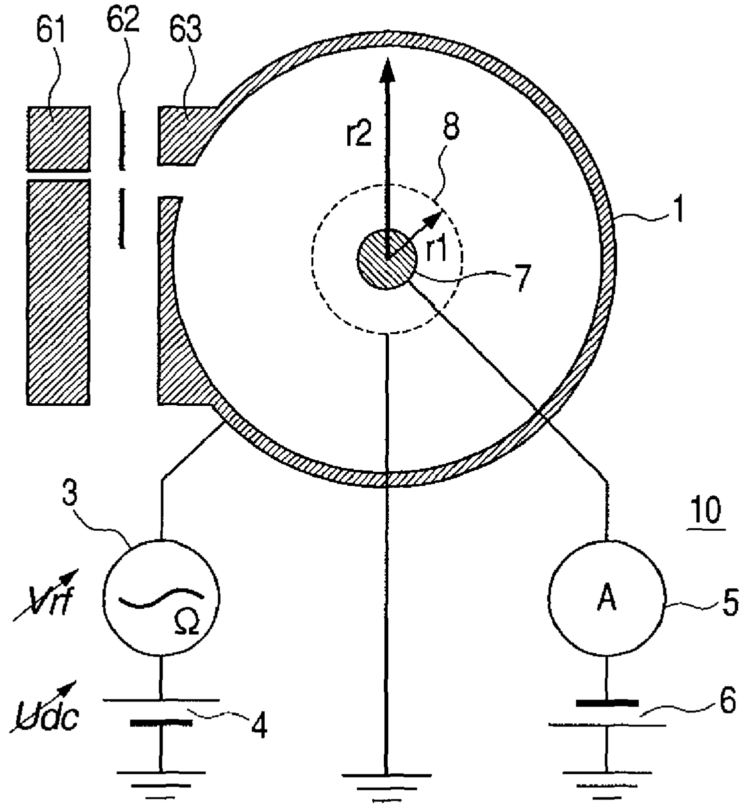
FIG. 7 is a drawing for describing another example of the basic circuit and the electrode structure for supplying ions in the second embodiment.

Ions passing through the fine holes in the input electrode 61 possess energy so cutting off the injection of ions into the hollow-cylindrical electrode 1 with parallel electrode 63 sometimes might not be possible even if an inverse voltage potential is applied from the gate electrode 62. Ions might also be carried away by air flow within the fine holes. A structure may therefore be employed where the Solid-cylindrical electrode 7 is not mounted on a line extending along the fine holes of input electrode 61, the holes in gate electrode 62 for passing ions, and the holes formed in the hollow-cylindrical electrode 1 with parallel electrode 63 for inputting ions. An example of the electrode structure and the basic circuit in this case is shown in FIG. 7.

As shown by the structure in this drawing, ions can be prevented from striking the Solid-cylindrical electrode 7 even assuming the case that the voltage potential on gate electrode 62 is inadequate and ions have passed through.

In this structure, the fine holes of input electrode 61, the holes in gate electrode 62 for passing ions, and the holes formed in the hollow-cylindrical electrode 1 with parallel electrode 63 for inputting ions are arrayed in a single line. Ions however can be attracted by the electrical potential so arraying these holes in a straight line is not necessary. In this case, the Solid-cylindrical electrode 7 need not be formed along a line extending just from the holes formed on the hollow-cylindrical electrode 1 with parallel electrode 63. Moreover, the ions entering from the hollow-cylindrical electrode 1 with parallel electrode 63 can strike the mesh hollow-cylindrical electrode 8 without passing through the holes 81 in mesh hollow-cylindrical electrode 8, by shifting the numerous holes 81 in the mesh hollow-cylindrical electrode 8 away from the holes in the hollow-cylindrical electrode 1 with parallel electrode 63. Collision with the Solid-cylindrical electrode 7 can in this way be prevented.

The one dimensional ion trap 10 of the first embodiment can be used in the mass spectrometer 40 of the present embodiment as described above. The present embodiment can therefore render the same effect as the first embodiment in mass spectroscopy. A particular advantage is that analysis is not dependent on gas pressure since mass spectroscopy is performed using steady and stable conditions for ions. Therefore, even operation at a low vacuum is possible. The low vacuum level here is typically about 1 Torr to $10^{-6}$ Torr. Mass spectroscopy using methods of the related art however utilizes the resonant vibration of the ions so that the resolution is drastically affected by collision with gas. Operation at a low vacuum level is therefore impossible and a high vacuum level of approximately $10^{-6}$ Torr to $10^{-8}$ Torr is required. The one dimensional ion trap 10 of this embodiment therefore has few restrictions and can be widely utilized in general applications.

Third Embodiment

The third embodiment of this invention is described next. The one dimensional ion trap 10 of the first embodiment is utilized here for measuring ion mobility (extent of ion movement). The structure of the equipment is fundamentally the same as shown for the second embodiment in FIG. 5 through FIG. 7.

The method for measuring ion mobility by using the one dimensional ion trap 10 of this embodiment is described next. The mass-to-charge ratio (m/z) of the ion type forming the target is first of all isolated using the technique described in the first embodiment. Mass spectroscopy and measurements may then be made at the mass-to-charge ratio (m/z) of the ion type forming the target with the technique previously described in the second embodiment. A RF voltage $V_{rf}$ that was set to a high amplitude is next applied so that these isolated ions are trapped in proximity to the outer side in the trapping space 11 of the one dimensional ion trap 10. Applying this RF voltage $V_{rf}$ has the effect of lengthening the drift distance of the isolated ions.

When the RF voltage $V_{rf}$ is momentarily cut off after trapping, ions pass through the holes in the mesh hollow-cylindrical electrode 8 and strike the Solid-cylindrical electrode 7 starting with ions with a large ion mobility K. The ion mobility is expressed by the difference (time differential) between the time that the RF voltage $V_{rf}$ is cut off and the time that the ion current is measured.

The ion mobility and the mass-to-charge ratio (m/z) of the sample ions can therefore be measured two dimensionally as described above. In other words, even if their mass-to-charge ratio (m/z) is the same, ions with different mobility values can be identified by utilizing the one dimensional ion trap 10 of this embodiment. The ion mobility may also be measured by cutting off the static voltage $U_{dc}$ immediately after trapping, and detecting the current at the Solid-cylindrical electrode 7. The computer 41 also controls the application of the RF voltage $V_{rf}$ and the static voltage $U_{dc}$, the timing stopping operation, and the amount of voltage that is applied in this embodiment.

The present embodiment measures the ion mobility by using the one dimensional ion trap 10 of the first embodiment as already described. The present embodiment can therefore provide an ion mobility measurement technique capable of rendering the same effects as the first embodiment with minimal environmental restrictions and can be widely used in general-purpose applications.

Utilizing the one dimensional ion trap of the first embodiment in each of the above embodiments allows performing mass spectroscopy with high accuracy and in the low vacuum pressure region. The one dimensional ion trap of this invention can therefore be used selectively or can be used jointly for both mass spectroscopy and for analysis in the pressure region mainly utilized for analysis by ion mobility measurement. The one dimensional ion trap of this invention can therefore be employed to make an ideal analysis according to the circumstances, make a more sophisticated analysis and enhance the analysis accuracy.

The invention of the above embodiments therefore provides a simple and inexpensive analysis tool and method capable of being utilized in multiple areas including environmental analysis, analysis of synthetic chemicals, medical analysis, illicit drug and hazardous substance analysis.

What is claimed is:

1. An ion trap comprising:

a first electrode connected to an alternating current power supply to apply an alternating current voltage and a direct current power supply to apply a direct current voltage; and a second electrode capable of passing the charged particles, wherein the direct current voltage and the alternating current voltage are applied to form a one dimensional potential capable of trapping charged particles between the first electrode and the second electrode, from a direct current potential generated by the direct current voltage and an alternating current potential generated by that alternating current voltage.

2. The ion trap according to claim 1, wherein the direct current voltage and the alternating current voltage are applied so that the one dimensional potential contains a minimal value.

3. The ion trap according to claim 1, wherein the direct current voltage is a electrostatic voltage, and wherein the alternating current voltage is a radio frequency voltage.

4. The ion trap according to claim 1, further comprising:

a third electrode facing the first electrode by way of the second electrode, wherein the third electrode contains a current measurement means to detect the electrical current resulting from the charged particles striking the third electrode.

5. The ion trap according to claim 1, wherein the second electrode contains multiple holes.

6. The ion trap according to claim 1, wherein the shape of the first electrode and the second electrode causes the density of the force applied to the charged particles to change from sparse to dense between the first electrode and the second electrode.

7. The ion trap according to claim 6, wherein the second electrode is a hollow-cylindrical shape, and wherein the first electrode is a hollow-cylindrical shape enclosing the second electrode and sharing a common center axis with the second electrode.

8. The ion trap according to claim 7, wherein the first electrode contains end electrodes shorted at both ends, and wherein the first direct current power supply further applies the direct current voltage to the end electrodes.

9. The ion trap according to claim 7, wherein the first electrode contains end electrodes at both ends, and wherein the first direct current power supply further applies the direct current voltage to the end electrodes.

10. The ion trap according to claim 7, wherein the third electrode is a Solid-cylindrical shape, and shares a common center axis with the first electrode and the second electrode.

11. A mass spectrometer comprising:

an ion trap comprising a first electrode connected to an alternating current power supply to apply an alternating current voltage and a direct current power supply to apply a direct current voltage, a second electrode capable of passing the charged particles, and a third electrode facing the first electrode by way of the second electrode and containing a current measurement means to detect the electrical current resulting from the charged particles striking the third electrode, the direct current voltage and the alternating current voltage being applied to form a one dimensional potential capable of trapping charged particles between the first electrode and the second electrode, from a direct current potential generated by the direct current voltage and an alternating current potential generated by that alternating current voltage;

a charged particle input means to input charged particles into the ion trap; and a control means to regulate the direct current power supply and the alternating current power supply, wherein, when the charged particle input means inputs charged particles into the ion trap, the control means applies a direct current voltage and an alternating current voltage to form the one dimensional potential and, during measurement of the electrical current by the current measurement means, the control means changes the quantity of at least one of either the direct current voltage and the alternating current voltage so that the charged particles trapped by the one dimensional potential are made to strike the third electrode.

12. The mass spectrometer according to claim 11, wherein the control means links the current measured by the current measurement means to at least one of the direct current voltage and the alternating current voltage quantity applied to cause a collision, and records that value, and then acquires the mass spectrum.

13. The mass spectrometer according to claim 11, wherein, after trapping the charged particles in the one dimensional potential, the control means regulate the application of at least one of the direct current voltage and the alternating current voltage so as to make the mass-to-charge ratio range where the ion trap can trap the charged particles, approach the mass-to-charge ratio of the charged particles to be detected.

14. The mass spectrometer according to claim 11, wherein the charged particle input means to introduce the charged particles so that the charged particles do not strike the third electrode directly.

15. The mass spectrometer according to claim 11, wherein the charged particle input means comprises:

an input electrode; and a parallel electrode to form a parallel electrical field between the first electrode and the input electrode.

16. The mass spectrometer according to claim 15, wherein the charged particle input means further includes:

a control means to regulate the quantity of charged particles input between the input electrode and the parallel electrode.

17. An ion mobility analyzer comprising:

an ion trap comprising a first electrode connected to an alternating current power supply to apply an alternating current voltage and a direct current power supply to apply a direct current voltage, a second electrode capable of passing the charged particles, and a third electrode facing the first electrode by way of the second electrode and containing a current measurement means to detect the electrical current resulting from the charged particles striking the third electrode, the direct current voltage and the alternating current voltage being applied to form a one dimensional potential capable of trapping charged particles between the first electrode and the second electrode, from a direct current potential generated by the direct current voltage and an alternating current potential generated by that alternating current voltage;

a charged particle input means to introduce charged particles into the ion trap; and a control means to regulate the direct current power supply and the alternating current power supply, wherein, when the charged particle input means to introduce charged particles into the ion trap, the control means regulate the application of a direct current voltage and an alternating current voltage to form the one dimensional potential and after the trapping, changes the amount of at least either the direct current voltage and the alternating current voltage so as to isolate the charged particles trapped in the one dimensional potential and after isolating, controls to cutoff by the direct current voltage or the alternating current voltage that was applied and utilizes the current measurement means to detected the difference between the time the current was measured time and the cutoff time.

18. A mass spectroscopy method for a mass spectrometer including the ion trap one comprising a first electrode connected to an alternating current power supply to apply an alternating current voltage and a direct current power supply to apply a direct current voltage, a second electrode capable of passing the charged particles, and a third electrode facing the first electrode by way of the second electrode and containing a current measurement means to detect the electrical current resulting from the charged particles striking the third electrode, the direct current voltage and the alternating current voltage being applied to form a one dimensional potential capable of trapping charged particles between the first electrode and the second electrode, from a direct current potential generated by the direct current voltage and an alternating current potential generated by that alternating current voltage, and a charged particle input means for inputting charged particles into the ion trap, the method comprising:

a trapping step to regulate the direct current power supply and the alternating current power supply to form the one dimensional potential, and trap the charged particles input by way of the charged particle input means; and a measurement step to regulate either of at least the direct current power supply and the alternating current power supply, make the charged particles trapped in the one dimensional potential strike the third electrode, and measure the current on an ammeter.

* * * * *